United States Patent
Fini et al.

(10) Patent No.: US 9,325,151 B1
(45) Date of Patent: Apr. 26, 2016

(54) SYSTEMS AND TECHNIQUES FOR COMPENSATION FOR THE THERMO-OPTIC EFFECT IN ACTIVE OPTICAL FIBERS

(71) Applicant: OFS FITEL, LLC, Norcross, GA (US)

(72) Inventors: John M Fini, San Jose, CA (US); Supradeepa V. S. Ramakrishna, Piscataway, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/670,806

(22) Filed: Mar. 27, 2015

(51) Int. Cl.
*H01S 3/067* (2006.01)
*H01S 3/13* (2006.01)
*H01S 3/102* (2006.01)
*H01S 3/10* (2006.01)

(52) U.S. Cl.
CPC ............. *H01S 3/102* (2013.01); *H01S 3/06754* (2013.01); *H01S 3/10007* (2013.01); *H01S 3/1301* (2013.01)

(58) Field of Classification Search
CPC . H01S 3/102; H01S 3/10007; H01S 3/06754; H01S 3/1301
See application file for complete search history.

(56) References Cited

U.S. PATENT DOCUMENTS

| | | | | |
|---|---|---|---|---|
| 4,529,265 A | * | 7/1985 | Toya | G02B 6/2558 385/71 |
| 4,974,932 A | * | 12/1990 | Nattermann | G02B 6/0365 385/124 |
| 5,552,887 A | * | 9/1996 | Dyott | G02B 6/4457 242/470 |
| 5,702,497 A | * | 12/1997 | Oh | C03B 37/01211 65/412 |

\* cited by examiner

*Primary Examiner* — Eric Bolda
(74) *Attorney, Agent, or Firm* — Jacobs + Kim LLP (57) ABSTRACT

A technique is described for providing compensation for the thermo-optic effect in a large-mode-area optical fiber, filter fiber, or the like. An optical fiber is provided having a refractive index profile with ambient temperature loss characteristics including a low loss for a first type of light and a high loss for a second type of light. A hot region of the fiber connected into an optical system is identified, in which a thermal index gradient is induced in the fiber. The thermal index gradient, in the absence of a compensating index gradient, would result in degradation of the fiber's ambient temperature loss characteristics. The fiber is arranged according to a layout having a position-varying bending diameter. Throughout the identified hot region, the fiber has a compensating bending diameter that induces a compensating index gradient in the fiber. Outside of the identified hot region, the fiber has an applied operating bending diameter that maintains the fiber's ambient temperature loss characteristics.

20 Claims, 8 Drawing Sheets

SYSTEMS AND TECHNIQUES FOR COMPENSATION FOR THE THERMO-OPTIC EFFECT IN ACTIVE OPTICAL FIBERS

BACKGROUND OF THE INVENTION

1. Field of the Invention

The present invention relates generally to the field of fiber optical technology, and in particular to systems and techniques for compensating for the thermo-optic effect in active optical fibers.

2. Background Art

Generally speaking, in a fiber laser operating at a high power level, it is desirable for the active gain fiber to be single-moded. Multimoded gain fibers pose a multitude of problems, including multimoded lasing, temporal instability, beam quality degradation, modal instability, and the like. Any of these issues can have catastrophic consequences in high-power fiber lasers and amplifiers.

Fibers utilized for high-power applications typically cannot be reliably made truly single-moded using conventional designs, owing to the low index contrasts that are required, which can also result in enhanced sensitivity to bend loss. As a practical matter, this issue can be overcome by utilizing multimode fiber designs having low loss for the fundamental mode and high loss for higher-order modes (HOMs). Such fiber designs are configured to provide strong coupling between the HOMs and the cladding modes, while minimizing coupling between the fundamental mode and the cladding modes. This arrangement causes the HOMs to leak into the cladding, while preserving the fundamental mode. The desired mode coupling characteristics are achieved through additional index features or physical effects, such as fiber coiling. Care must be taken to ensure that the structures used to enhance HOM loss do not increase loss of the fundamental mode to an unacceptable level.

However, the loss characteristics for the above-described fiber designs are adversely affected by the thermo-optic effect. In a fiber laser or amplifier, there is continuous generation of heat in the core due to the gain process (quantum defect) which is dissipated to the outside of the fiber through the cladding. This generation and dissipation of heat result in a temperature gradient in the fiber. This temperature gradient results in a corresponding index gradient, which can reduce the coupling of the HOMs to the cladding modes, thereby degrading the HOM suppression required for single-moded operation.

Filter fibers are another class of fibers which utilize similar ideas of coupling to the cladding to create enhanced loss beyond a specific wavelength while preserving low loss at the operating wavelength. Active filter fibers have been utilized to suppress nonlinearities like stimulated Raman scattering in high power lasers and amplifiers. The index gradient as a result of thermo-optic effect creates similar issues of position-dependent degradation of wavelength selectivity. To preserve the wavelength selectivity, compensation must be provided for this degradation.

SUMMARY OF INVENTION

An aspect of the invention is directed to a technique for compensating for a thermal index gradient in an optical fiber. An optical fiber is provided having a refractive index profile with ambient temperature loss characteristics including a low loss for a first type of light and a high loss for a second type of light. A hot region of the fiber connected into an optical system is identified, in which a thermal index gradient is induced in the fiber. The thermal index gradient, in the absence of a compensating index gradient, would result in degradation of the fiber's ambient temperature loss characteristics. The fiber is arranged according to a layout with a position-varying bending diameter. Throughout the identified hot region, the fiber has a compensating bending diameter that induces a compensating index gradient in the fiber. Outside of the identified hot region, the fiber has an applied operating bending diameter that maintains the fiber's ambient temperature loss characteristics.

In an exemplary practice of the invention, bend compensation is used to prevent degradation of the single-modedness of a large-mode-area fiber. In a further practice of the invention, bend compensation is used to prevent degradation of the bandpass characteristics of an optical fiber filter.

DETAILED DESCRIPTION

An aspect of the invention provides optical fiber layouts that compensate for the thermo-optic effect in optical fibers. According to a practice of the invention, thermo-optic compensation is provided for an optical fiber by arranging the fiber according to a scheme comprising specific length-varying curvatures. In one example, described below, the length-varying curvature is configured to provide first-order compensation for the index gradient created by the thermo-optic effect at each given fiber length. Equivalently, the length-varying curvature is configured to provide a reasonable level of compensation for the level of HOM loss or wavelength-selective loss at each given fiber length.

It is noted that fiber layouts according to the present invention can take a number of different shapes (e.g., circular, elliptical, figure eight, kidney-shaped, and the like) and forms, including for example: coils, spirals, helixes, serpentine forms, and variations and combinations thereof, in two and three dimensions, and with various degrees of symmetry and concentricity.

The described practices of the invention can be used, for example, to compensate for degradation of higher-order mode (HOM) suppression in an active gain fiber or to compensate for degradation of wavelength selectivity in an active filter fiber. Aspects of the invention are applicable to various fiber designs, including trench-based designs, pedestal-based designs, chirally-coupled-core (CCC) fibers, and HOM fibers, and the like.

In the following discussion, aspects of the present invention are described using the example of HOM suppression in active large mode area (LMA) fibers. As used herein, an "LMA fiber" refers to a fiber having an effective area $A_{eff}$ of 100 µm² or greater at a wavelength band of operation.

It will be appreciated that the described techniques apply equally well in the context of filter fibers. The proposed solution utilizes fiber layouts to compensate for the thermo-optic degradation of HOM loss through addition of bend-induced index gradients. Additionally, the compensatory bending is position-dependent such that it compensates to a reasonable level the length dependent degradation. This may be necessary because, if the compensation bending compensates for more than the thermo-optic degradation, there is a possibility of enhanced fundamental mode loss, which would make the system inefficient or unusable. This is also the reason that a tight constant diameter would not work well.

Effects like modal instability are nonlinear in nature and have maximum gain where the heat generation in the fiber is maximal. This requires compensation of HOM loss degradation everywhere to prevent growth of light in the HOMs. A lumped-system approach with a net loss for HOMs can result in inefficiencies since HOM light can be generated and then lost at a later stage.

The position-dependent degradation of HOM loss and additional bending necessary to compensate it can be evaluated given the pumping profile, fiber properties and amplifier configuration.

As discussed above, for high-power applications, particularly narrow-linewidth or pulsed fiber lasers and amplifiers, fibers with significantly larger core sizes are desired. However, the use of a larger core size in a conventional fiber desire results in multimoded operation, which creates a multitude of problems, including: multimoded lasing, temporal instability, beam quality degradation, modal instability, and the like. To overcome the multimoded nature, one design strategy that has been adopted is to use a multimoded fiber but having sufficiently high losses for the HOMs to overcome the problems associated with them. This is achieved using additional structures in the cladding (e.g., leaky modes, resonant coupling, etc.) or using physical effects (e.g., coiling) which enhance the loss for HOMs by increasing coupling between them and the cladding.

As used herein, the terms "cold fiber" and "cold region" refer to a fiber or fiber region in which there is no temperature gradient, or in which the temperature gradient is insignificant. The terms "hot fiber" and "hot region" refer to a fiber or fiber region in which there is a significant temperature gradient.

Figure 1:
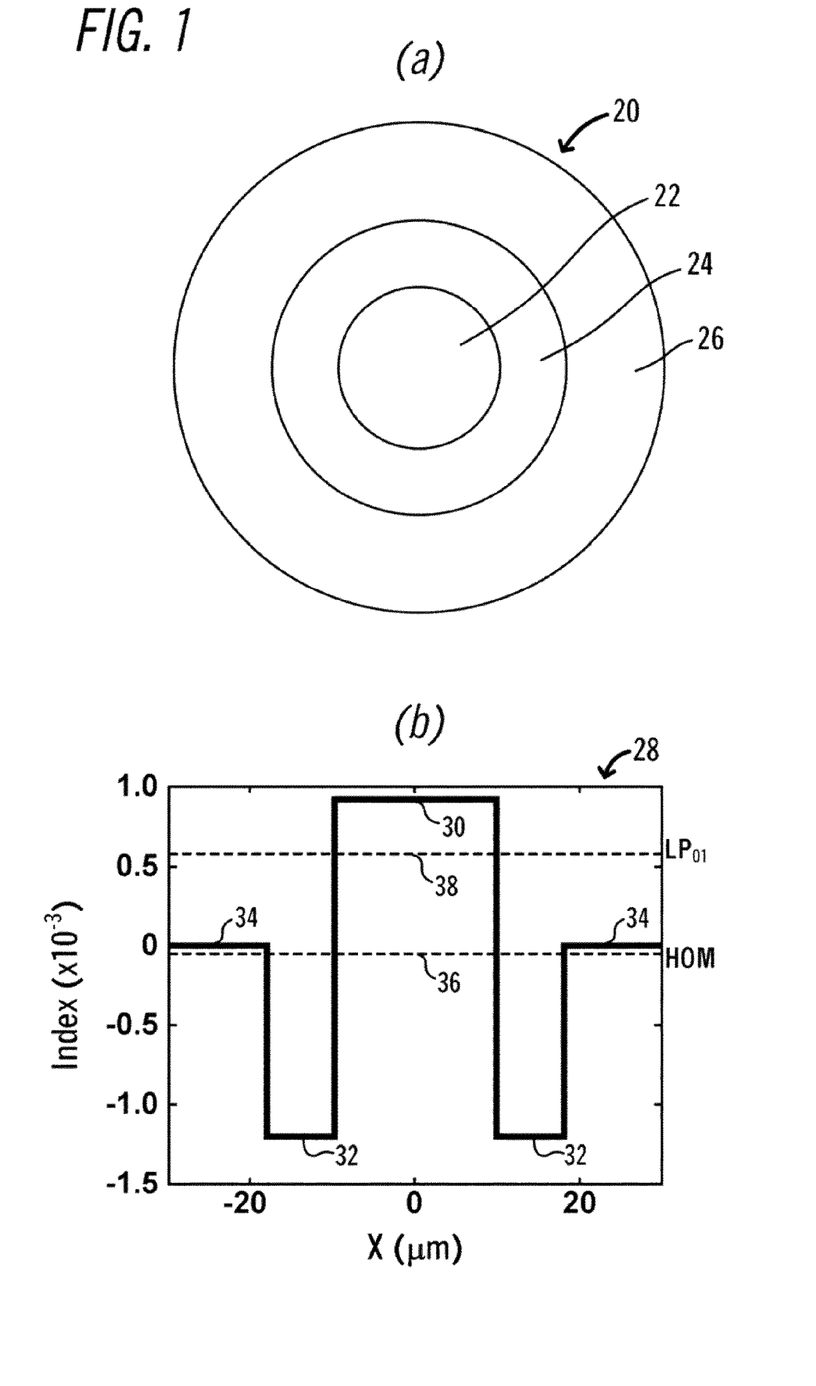
FIG. 1(a) shows a cross-section diagram of a large mode area (LMA) fiber, with enhanced loss for higher-order modes (HOMs)
FIG. 1(b) shows the W-shaped refractive index profile for the fiber.
Figure 2:
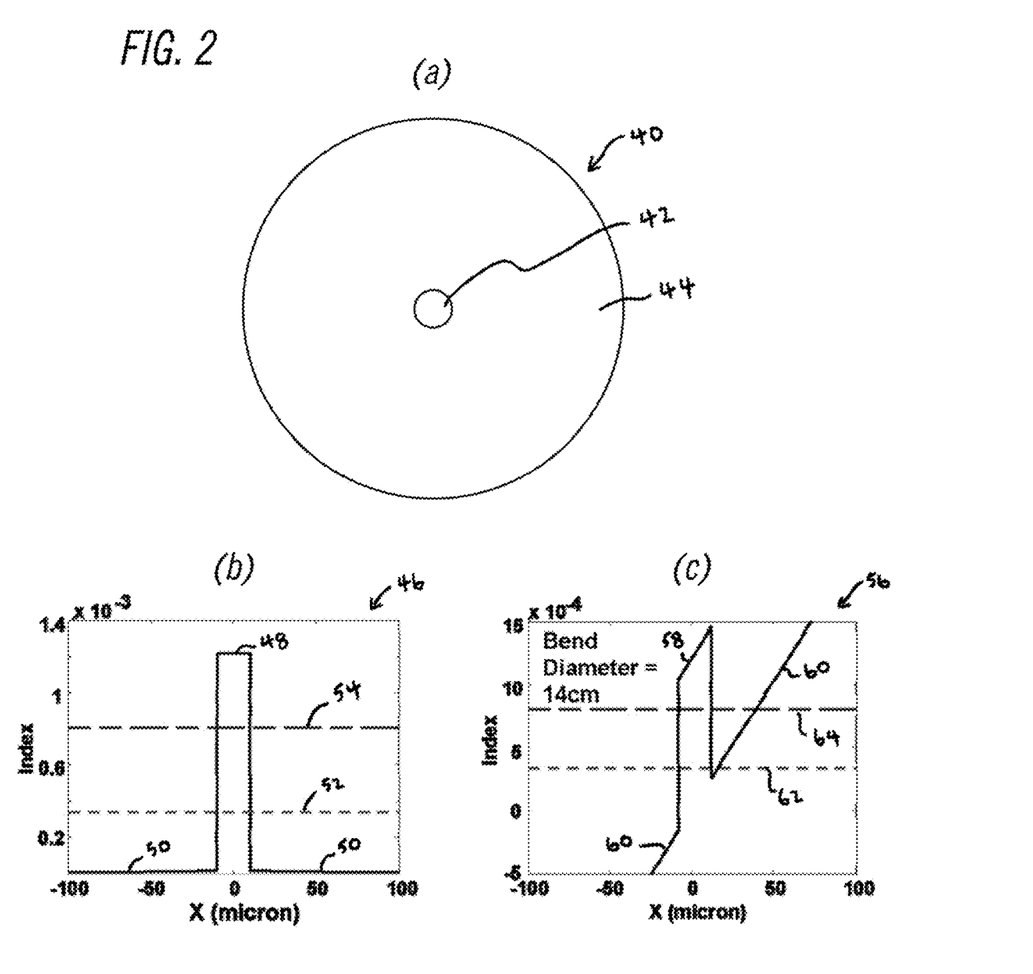
FIG. 2(a) shows a cross-section diagram of an exemplary step-index fiber.
FIG. 2(b) shows the refractive index profile for the fiber in a straight (i.e., unbent) configuration.
FIG. 2(c) shows an index profile for the fiber in a bent (i.e., coiled) configuration.

FIGS. 1 and 2 illustrate some design strategies that are currently used to provide single-moded operation in a fiber supporting the fundamental mode and one or more higher-order modes (HOMs).

FIG. 1(a) shows a cross-section diagram of an LMA fiber 20, with enhanced loss for HOMs, comprising a core 22, an inner cladding 24, and an outer cladding 26. FIG. 1(b) shows the W-shaped refractive index profile 28 for fiber 20, in which center spike 30 corresponds to core 22, trench regions 32 correspond to the inner cladding 24, and the flat outer portion 34 corresponds to outer cladding 26. Core 22 has a diameter of 20 µm and a nominal index difference of $0.9 \times 10^{-3}$ relative to the silica outer cladding 26.

In index profile 28, broken line 38 indicates the effective modal index for the fundamental mode, i.e., the $LP_{01}$ mode. Broken line 36 indicates the effective mode index for the next higher-order mode (HOM).

In the following discussion, the terms "fundamental mode" and "$LP_{01}$ mode" are used interchangeably, unless otherwise indicated. Further, unless otherwise indicated, the terms "HOM" or "first HOM" refer to the first higher-order mode after the fundamental mode (i.e., the $LP_{11}$ mode). It will be understood that, for the purposes of the present discussion, other HOMs may be present that are not shown, and that the present discussion applies to these other HOMs.

In fiber 20, although both the fundamental mode and the HOM are present, the effective modal index of the fundamental mode is above the cladding index, and the effective modal index of the HOM is below the cladding index. This results in tunneling loss of the HOM through the trench region into the cladding, creating a large loss for the HOM. The fundamental mode is unaffected by this, resulting in single-moded transmission.

FIG. 2(a) shows a cross-section diagram of an exemplary step-index fiber 40, comprising a core 42 and a surrounding cladding 44.

FIG. 2(b) shows the refractive index profile 46 for fiber 40 in a straight (i.e., unbent) configuration. Center spike 48 corresponds to core 42, and the flat outer portion 50 corresponds to the fiber cladding 44.

In index profile 46, broken line 54 indicates the effective modal index for the fundamental mode, i.e., the $LP_{01}$ mode. Broken line 52 indicates the effective mode index for the next higher-order mode (HOM).

Both the modes are well-guided and expected to have low loss (i.e., only a small portion of the transmitted light will leak into the cladding).

FIG. 2(c) shows an index profile 56 for fiber 40 in a bent (i.e., coiled) configuration, in which the changes in the fiber's optical characteristics caused by bend having a diameter of 14 cm are depicted as an index gradient on the bend plane, represented by the x-axis, in accordance with Equation (1):

$$n_{eq}(x) = n(x) + n_{silica}\frac{x}{R_{bend}} \quad (1)$$

In the FIG. 2(c) index profile 56 it will be seen that the bend-induced index gradient results in a significant modification in the respective indices of the fiber core 42 (represented by center spike 58) and cladding 44 (represented by outer flat region 60), relative to the effective indices of the fundamental mode (line 64) and the first HOM (line 62).

It will be seen that there is now significant coupling between the HOM and the cladding, leading to a corresponding amount of tunneling loss for the HOM. It will further be seen that there will be less coupling between the fundamental mode and the cladding, meaning that the bend-induced loss will be less than that of the HOM. Of importance here is the difference in tunneling distances between the two modes to ensure high HOM loss while having low fundamental-mode loss. It is noted that, in order to avoid an unacceptably high level of loss for the fundamental mode, the fiber should not be coiled too tightly.

In an active fiber there is an additional effect that needs to be considered. In the process of amplification, even in the ideal case, a fraction of the pump light is converted to heat due to the quantum defect between the pump and the signal. This heat is dissipated through the cladding and the coating into a heat sink around the fiber (e.g., a metallic contact or air). This creates a radial temperature gradient between a maximum temperature at the fiber core and a lower temperature at the fiber coating. Due to the thermo-effect in silica, the temperature gradient introduces a corresponding index gradient into the fiber's refractive index profile. The index gradient can counteract the coupling introduced between the HOM and the cladding, resulting in deterioration of the HOM loss that can make the fiber more multimoded.

Further, the pump absorption in the fiber is position-dependent, with the result that the heat-induced index gradient varies as a function of position. In the case of forward pumping configuration, pump absorption exponentially decreases along the fiber length. In the case of bidirectional pumping, pump absorption varies according to the sum of two exponentials. The deterioration of HOM loss decreases in correspondence with a decrease in heat generation in the fiber. To evaluate the index-gradient, a cylindrical shell model for heat conduction in the fiber is assumed. The temperature profile in the core is assumed to be constant and all heat generated is assumed to be from the quantum defect. The heat sinking around the coating is assumed to be circularly symmetric.

Figure 3:
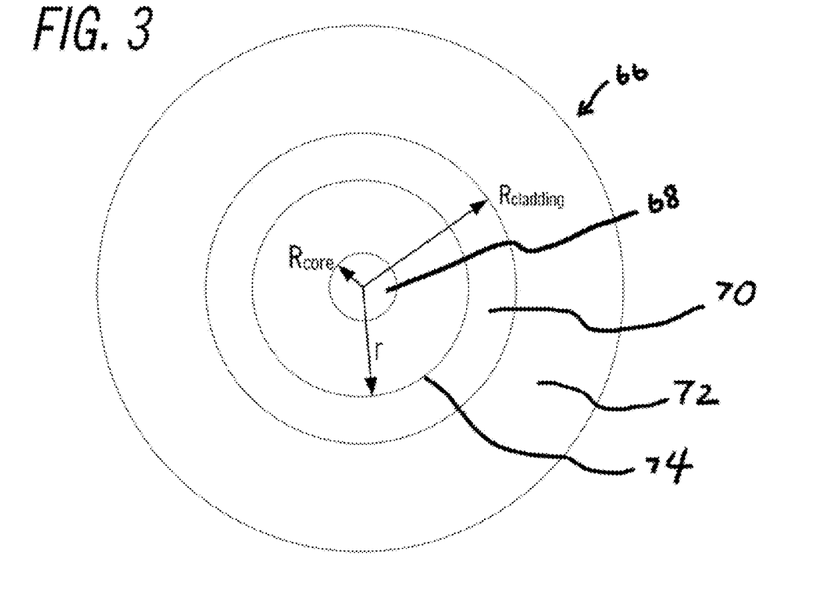
FIG. 3 shows a cross section of an exemplary active fiber.

FIG. 3 shows a cross section of an exemplary active fiber 66, comprising:

a central core region 68 having radius $r_{core}$;

an inner cladding 70 having an inner radius $r_{core}$ and an outer radius $r_{cladding}$; and an outer coating 72 surrounding the cladding 70.

For the purposes of the present discussion, the outer coating 72 is assumed to be provided with heatsinking that is circularly symmetric.

The temperature profile in fiber 66 at a distance 74 from the core (i.e., radius r) is given by Equation (2):

$$T(r,z) = \begin{cases} \left(\frac{Q}{l}\right)\frac{1}{2\pi K_{glass}}\left(\ln\frac{R_{clad}}{R_{core}} - \ln\frac{r}{R_{core}}\right) + T_{cladding-coating}, & r > R_{core} \\ \left(\frac{Q}{l}\right)\frac{1}{2\pi K_{glass}}\ln\frac{R_{clad}}{R_{core}} + T_{cladding-coating}, & r \le R_{core} \end{cases} \quad (2)$$

where (Q/l) is the length-dependent heat generation per unit length and $K_{glass}$ is the thermal conductivity of silica glass. The temperature gradient in the coating together with the heat-sinking configuration is captured by a single temperature value at the cladding-coating interface. This is sufficient because (1) the quantity of interest is the index gradient and not the offset; and (2) the thermo-optic effect is linear in the temperature range of interest.

The net index in a hot fiber as a function of position z along the length of a fiber is given by Equation (3):

$$n_{hot}(r,z) = n_{cold}(r) + dt/dn T(r,z) \quad (3)$$

where dn/dT is the thermo-optic coefficient of silica, which is $\sim 1.1 \times 10^{-5}$/C. The heat generation per unit length can be written as the following Equation (4):

$$\frac{Q}{l} = (1-\eta)\left|\frac{dP(z)}{dz}\right| \quad (4)$$

where P(z) is the pump power as a function of z and η is the quantum defect.

Pump absorption is conventionally modeled as a forward pumping scheme with an exponential decay over length. Using that model, the above expression can be further simplified to the following Equation (5):

$$Q/l = (1-\eta)\alpha_{pump}P_{pump}\exp(-\alpha_{pump}z) \quad (5)$$

where $\alpha_{pump}$ is the absorption coefficient for the pump.

Figure 4:
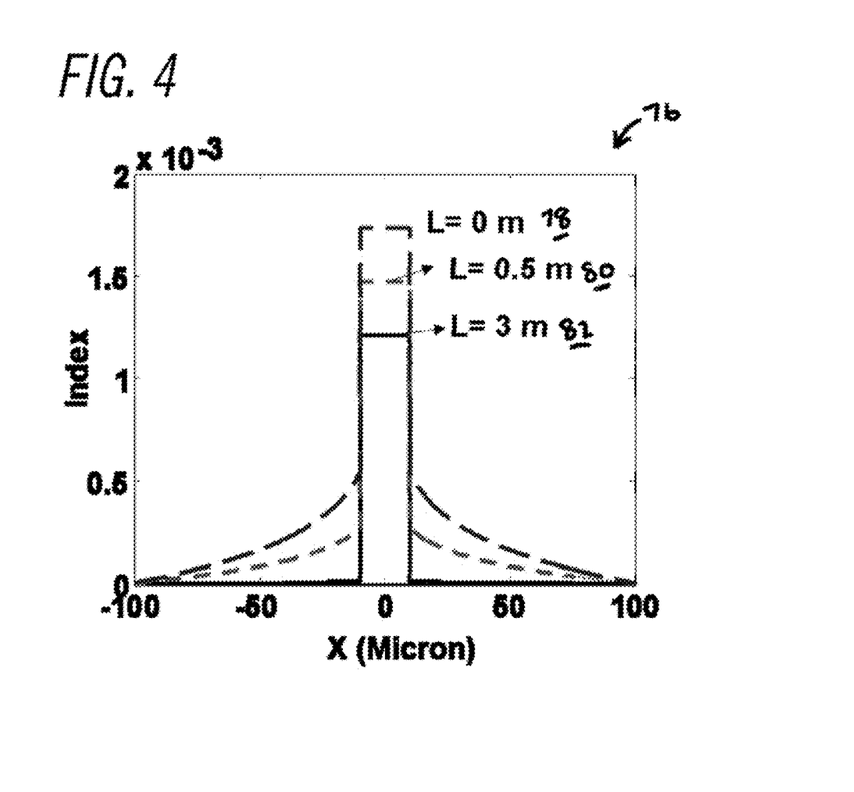
FIG. 4 shows a composite index profile for the step-index fiber from FIG. 2, illustrating modification of the index profile as a function of length.

FIG. 4 shows a composite index profile 76 for the step-index fiber 40 from FIG. 2, illustrating the modification of the index profile as a function of length. Plot 78 shows the index profile at L=0 m; plot 80 shows the index profile at L=0.5 m; and plot 82 shows the index profile at L=3 m. The index profiles illustrated by plots 78, 80, and 82 are obtained by adding the thermo-optic component given by Equations (1) and (5). The experimental parameters assumed are:

a Yb-doped fiber amplifier comprising 3 meters of fiber with a doped core diameter of 20 μm and a cladding diameter of 200 μm;

an exponential model for cladding absorption with value of 6 dB/m at the pump wavelength of 975 nm; a signal wavelength of 1064 nm; and total launched pump power of 1500 W.

The thermal conductivity of silica glass is assumed to be 1.2 W/m/K.

It is clear from FIG. 4 that the index excursion in the identified hot regions of an active fiber can be a sizable fraction of the fiber core index, and that the amount of index excursion varies with position.

Figure 5:
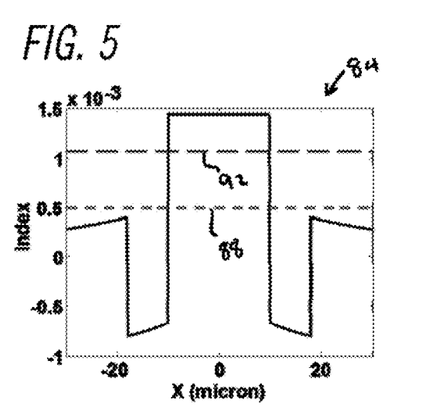
FIG. 5 shows a modified hot index profile for the LMA fiber shown in FIG. 1, indicating modification of the profile by the thermo-optic effect at the hottest region of the fiber.
Figure 6:
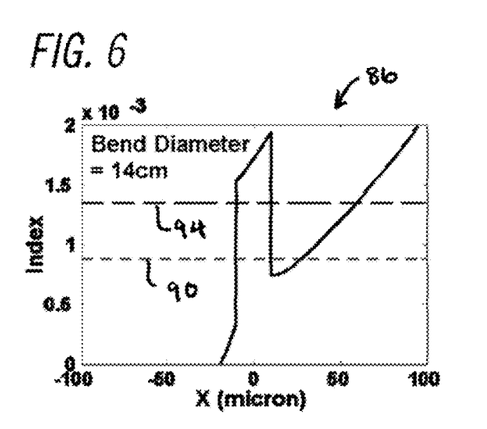
FIG. 6 shows a modified hot index profile for the step-index fiber shown in FIG. 2.

FIG. 5 shows the modified hot index profile 84 for the LMA fiber shown in FIG. 1, indicating the modification of the profile by the thermo-optic effect at the hottest region (L=0 m); FIG. 6 shows the modified hot index profile 86 for the step-index fiber shown in FIG. 2. Also shown in FIGS. 5 and 6 are the respective simulated effective modal indices of the fundamental mode 92, 94 and the first HOM 88, 90. Here, it is assumed that glass dopants are used to reduce the index in the trench region have sufficiently low concentration to produce a negligible difference in dn/dT from silica. The influence of the thermo-optic gradient is prominent.

In the case of the W-shaped fiber illustrated in FIG. 5, the effective modal index of the HOM has risen above the cladding index. This, in turn, results in removal of the tunneling-loss component for the HOM, thereby making the fiber multimoded.

In the case of the step-index fiber illustrated in FIG. 6, the modified index profile incorporates the same bending diameter as the bending diameter in FIG. 2(c) (i.e., 14 cm). However, compared to FIG. 2(c), it is clear that the tunneling distance for the HOM has significantly increased and this is expected to reduce its loss.

Using a comprehensive two-dimensional mode solver, the exact reduction in loss was evaluated for the case of the step-index fiber. The simulation also included the strain-induced bend-relaxation component. This component results in an effective index gradient that is approximately 0.8 times the index gradient given by the bending component alone (based on Equation (1)).

Figure 7:
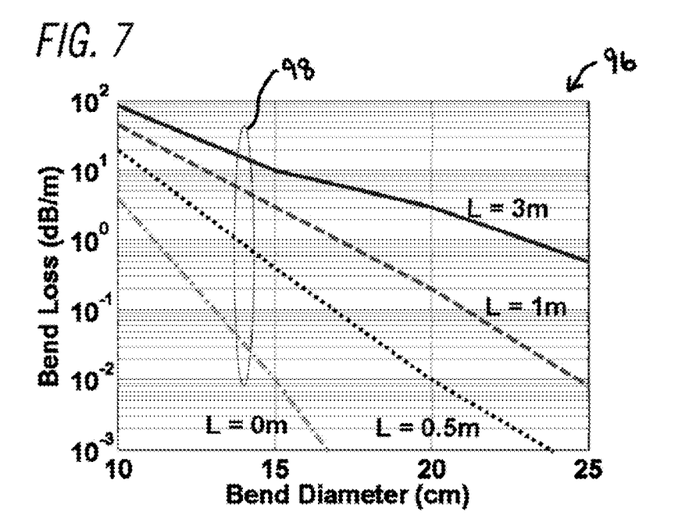
FIG. 7 shows a graph illustrating, for the step-index fiber shown in FIG. 2, simulated loss for the first HOM at various z positions as a function of bend-diameter.

FIG. 7 shows a graph 96 illustrating, for the step-index fiber shown in FIG. 2, the simulated loss for the first HOM at various z positions as a function of bend-diameter. The case of D=14 cm is indicated by the circled region 98. The L=3 m case is representative of the cold fiber, since most of the pump has been absorbed by this point. For this case, there is significant loss for the HOM (i.e., greater than 15 dB/m) for D=14 cm. However, as the fiber gets hotter, this reduces significantly. For the hottest case (L=0 m), the HOM loss has decreased to ~0.04 dB/m, which is negligibly small.

It is clear from the figure that compensation of the thermal gradient is absolutely essential to maintain the single-modedness of the gain fiber. The gain-per-unit-length for the HOM in nonlinear effects like modal instability can be several dB/m to 10s of dB/m. "Single-modedness" in this context would necessarily result in higher loss for the HOM than the gain component.

According to an aspect of the invention, the above-described degradation can be overcome by a compensatory bending, wherein the applied bending comprises two components: a first component to compensate for thermo-optic degradation in hot regions of a fiber and a second component to provide a suitable applied bend in cold regions of the fiber. The relation between applied bend-radius to the cold fiber bend-radius can be expressed as the following Equation (6):

$$\frac{1}{R_{applied}(z)} = \frac{1}{R_{compensation}(z)} + \frac{1}{R_{cold}(z)} \quad (6)$$

where, in general, both terms on the right-hand side can be functions of z. In the case of degradation compensation in a fiber which does not rely on bending for HOM suppression, the applied bend is the same as the compensation bend. In the case of step-index fiber which requires a specific bend in a cold configuration, the applied bend is calculated from Equation (6).

Figure 8:
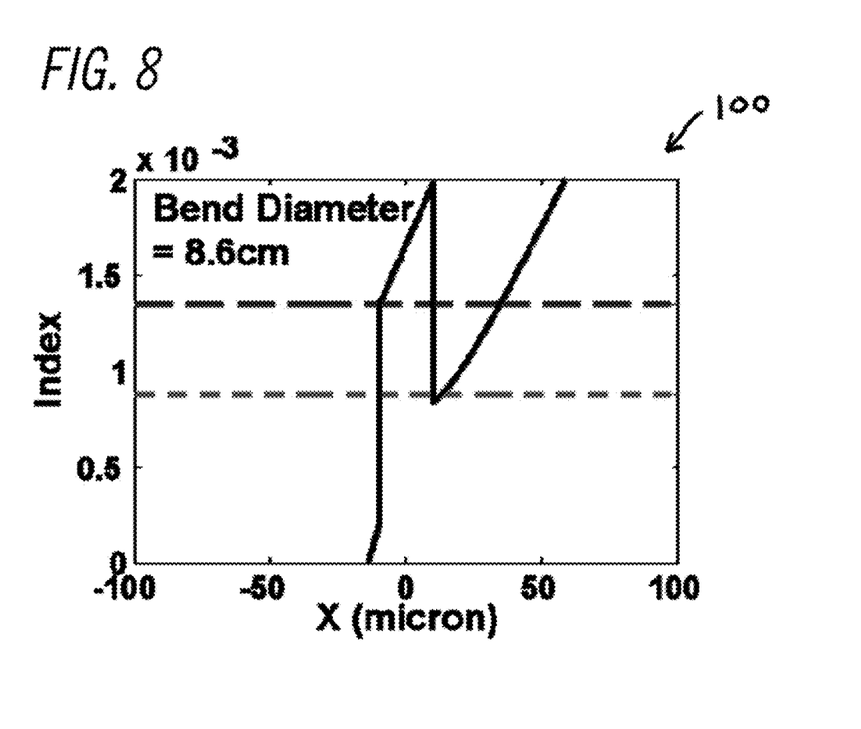
FIG. 8 shows the index profile of the step-index fiber shown in FIG. 2 at the hottest region, but with a tighter bend compared to FIG. 6 in order to compensate for thermo-optic degradation.

FIG. 8 shows the index profile 100 of the step-index fiber shown in FIG. 2 at the hottest region (L=0 m) but with a tighter bend of 8.6 cm compared to FIG. 6, in order to compensate for thermo-optic degradation. The tunneling distance for the HOM has decreased back to the levels in FIG. 2(c). The calculated loss for the HOM in this case is similar to the case of cold fiber at the operation diameter of 14 cm. The loss for the fundamental mode remains low.

The limitation in using a constant tight bending throughout the amplifier arises from the fundamental mode ($LP_{01}$) loss. The additional index gradient which compensates for the thermo-optic effect in the case of a hot fiber creates excessive gradient in a cold fiber, which leads to enhanced loss for the fundamental mode.

Figure 9:
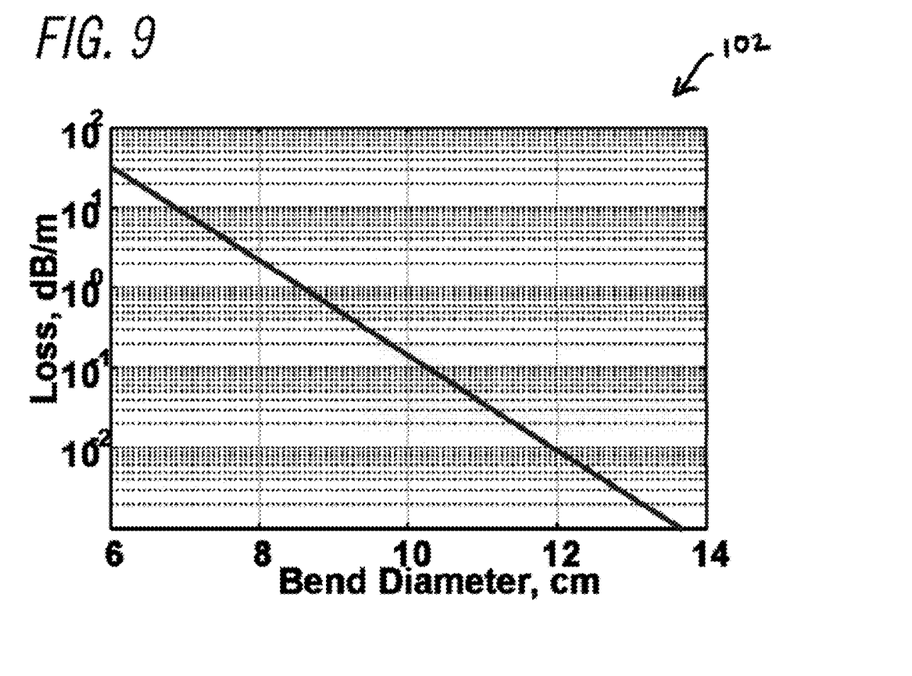
FIG. 9 shows a graph that illustrates loss for the fundamental mode as a function of bend diameter in a cold region of a fiber.

FIG. 9 shows a graph 102 that illustrates loss for the fundamental mode as a function of bend diameter in the cold region (L=3 m). The loss at a bend-diameter of 8.6 cm, corresponding to the compensatory bend at L=0 m, is greater than 1 dB/m, which would drastically degrade performance. The loss at the intended bend diameter (~14 cm) is <0.01 dB/m. In general, the fundamental mode loss should preferably be less than 0.5 dB/m, or more preferably less than 0.1 dB/m. Guidelines for fundamental mode loss can also be expressed in terms of total signal loss accumulated along the path of the active fiber. In that case, the loss of the active fiber device should preferably be less than 1 dB, or more preferably less than 0.2 dB. This necessitates the utilization of a length-varying bend profile to simultaneously compensate for the thermo-optic degradation at all positions while not introducing additional losses for the fundamental mode.

To obtain the necessary compensation bend as a function of position, from Equations (2) through (4), the thermo-optic component in the cladding in the plane of the bend can be expressed as the following Equation (7):

$$n_{TO}(x, z) = \frac{dn}{dT}(1-\eta)\left|\frac{dP}{dZ}\right|\frac{1}{2\pi K_{glass}}\left(\ln\frac{R_{clad}}{R_{core}} - \ln\frac{x}{R_{core}}\right) + \quad (7)$$

$$T_{cladding-coating}, x > R_{core}$$

The index-gradient created by the bending is $$n_{bend}(x, z) = n_{silica}\frac{x}{R_{compensation}(z)} \quad (8)$$

The bend-related gradient is linear while the gradient component in the thermo-optic component is logarithmic, with an additional offset term. This results in a first-order bend-compensation. As will be shown below, first-order bend-compensation works sufficiently well. A net index-offset does not affect the wave-guiding properties. The required compensation bend radius is obtained by setting the derivative of the total index to zero, resulting in the following Equation (9):

$$\frac{1}{R_{compensation}(z)} = \frac{dn}{dT}(1-\eta)\left|\frac{dP}{dZ}\right|\frac{1}{2\pi K_{glass}}\frac{1}{n_{silica}}\frac{1}{\bar{R}} \quad (9)$$

where the variable x has been replaced with an effective radial parameter which captures the relevant length scale at which the coupling between the HOM and the cladding occurs. For a required effective bend-diameter, the radial coordinate at which the effective modal index of the HOM intersects the cladding feature is a good approximation for this. This can be further optimized for specific fiber index profiles by looking at the obtained HOM loss. For the case of the step-index profile fiber discussed in this work, is chosen to be ~14 μm. The above expression can be further simplified for the case of forward pumping with exponential pump absorption as the following Equation (10):

$$\frac{1}{R_{compensation}(z)} = \tag{10}$$

$$\frac{dn}{dT}(1-\eta)\frac{1}{2\pi K_{glass}}\frac{1}{n_{silica}}\frac{1}{\bar{R}}\alpha_{pump}P_{pump}\exp(-\alpha_{pump}z)$$

Grouping the constants together, Equation (10) can be rewritten as:

$$R_{compensation}(z) = R_0 \exp(\alpha_{pump} z) \tag{11}$$

Where the bend radius at z=0:

$$R_0 = 1 \bigg/ \left( \frac{dn}{dT}(1-\eta)\frac{1}{2\pi K_{glass}}\frac{1}{n_{silica}}\frac{1}{\bar{R}}\alpha_{pump}P_{pump} \right) \tag{12}$$

In two dimensions, a curve satisfying Equation (11) is referred to as a Nielsen's spiral or a SiCi (sine integral, cosine integral) spiral. It is noted that, a three-dimensional layout may also be employed, in which a fiber is arranged according to a three-dimensional curve satisfying Equation (11).

Figure 10:
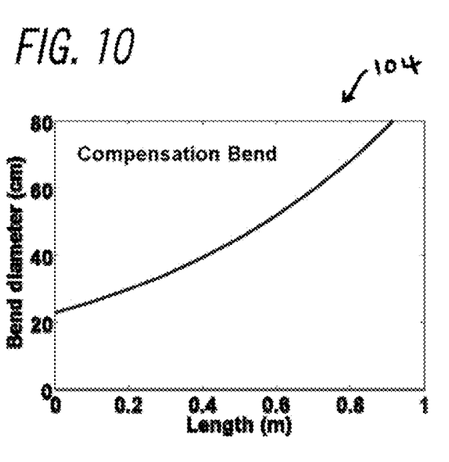
FIG. 10 shows a graph illustrating compensation bend-diameter as a function of length for described experimental parameters.
Figure 11:
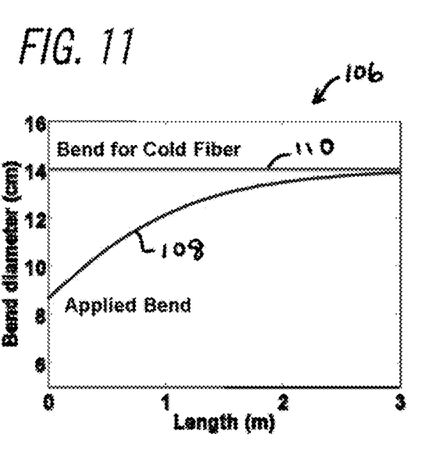
FIG. 11 shows a graph illustrating applied bend as a function of length for a specific cold-fiber bend diameter.

FIG. 10 shows a graph 104 illustrating compensation bend-diameter as a function of length for the experimental parameters previously described. FIG. 11 shows a graph 106, in which plot 108 illustrates the applied bend as a function of length for a specific cold-fiber bend diameter (i.e., 14 cm, indicated by line 110).

Figure 12:
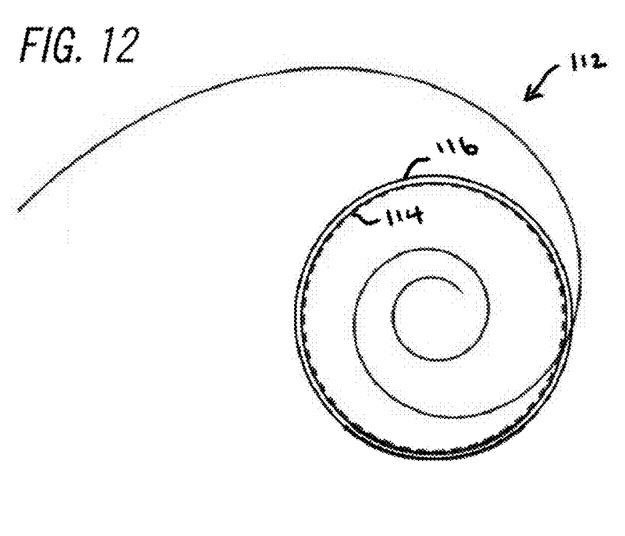
FIG. 12 is a schematic diagram indicating a custom spiral configuration that provides compensation for the thermo-optic effect.

FIG. 12 is a schematic diagram indicating a custom spiral configuration 112 that provides compensation for the thermo-optic effect. In the regions which are hottest, the necessity of the variable curvature is most prominent. As the net head load decreases, the required compensation curvature becomes less significant. Practically, the layout on the custom spiral can be truncated at a specific point where the head load has become sufficiently low, indicated by the dashed circle 114. As indicated in the figure by the solid circle 116, at this point the fiber can be arranged to have a near constant curvature, such as in a conventional coiled configuration.

Figures 13, 14:
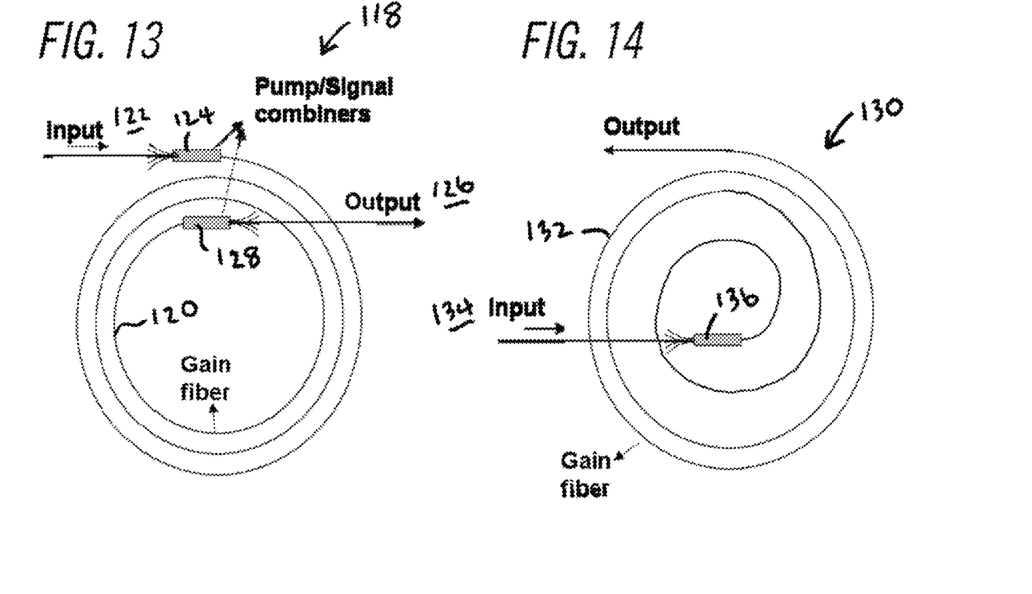
FIG. 13 shows a schematic diagram of a common layout configuration of a bidirectionally-pumped amplifier, laid out onto a plane.
FIG. 14 shows a schematic diagram illustrating a forward-pumped amplifier layout, in which bend compensation is provided in accordance with the present invention.

FIG. 13 shows a schematic diagram of a common layout configuration of a bidirectionally-pumped amplifier 118, laid out onto a plane. Amplifier 118 comprises an active fiber 120 having an input end 122 to which is connected a first pump/signal combiner 124 and an output end 126 to which is connected a second pump/signal combiner 128. Typically, an Archimedean (i.e., arithmetic) spiral is formed, in which a substantially constant curvature can be maintained along the length of the fiber. While a travelling wave amplifier is described here, similar principles apply to resonant cavity fiber lasers.

FIG. 14 shows a schematic diagram illustrating a forward-pumped amplifier layout 130, in which bend compensation is provided in accordance with the present invention. Amplifier 130 comprises an active fiber 132 having an input end 134 to which is connect a pump/signal combiner 136. Amplifier fiber 132 is deployed using a length-varying curvature based on the applied bend shown in FIG. 11 (not drawn to quantitative accuracy). Because of the length-varying curvature, the area occupied by the amplifier is larger than that of a conventional layout. For this reason, the layout illustrated in FIG. 14 would not be generally adopted unless necessary to provide bend compensation as described herein.

Figure 15:
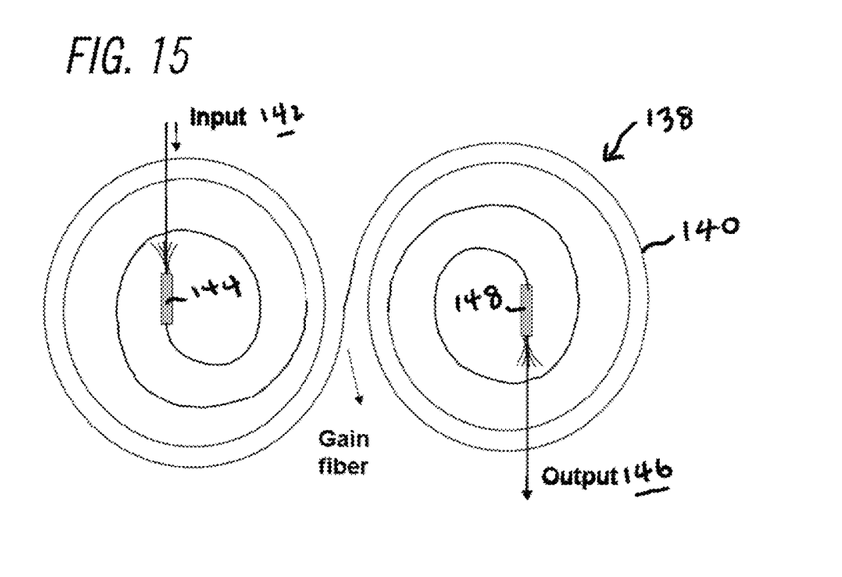
FIG. 15 shows a schematic diagram illustrating a bidirectionally-pumped amplifier layout in accordance with the present invention.

FIG. 15 shows a schematic diagram illustrating a bidirectionally-pumped amplifier layout 138 in accordance with the present invention. Amplifier 138 comprises an active fiber 140 having an input end 142 to which is connected a first pump/signal combiner 144 and an output end 146 to which is connected a second pump/signal combiner 148.

The increased heating at both the input end 136 and the output end 138 of the amplifier 132 results in the necessity of tighter bending diameters towards both ends. This can be achieved, among other ways, by the dual-spiral structure shown in FIG. 15.

Figure 16:
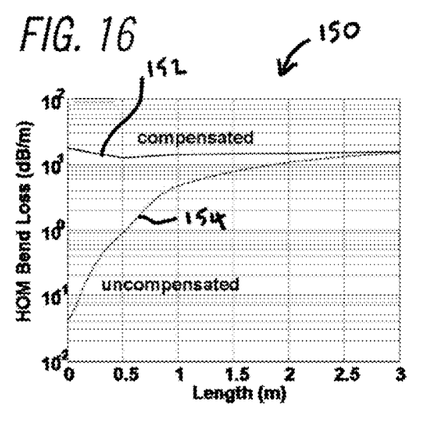
FIG. 16 shows a graph illustrating bend loss for a first HOM at varying axial positions for a compensated fiber and for an uncompensated fiber having a near constant bend diameter.

FIG. 16 shows a graph 150 illustrating the bend loss for the first HOM at varying axial positions (i.e., as a function of length) for the compensated fiber (plot 152) and the uncompensated fiber (plot 154) having a near constant bend diameter of 14 cm. The bend profiles for the two are shown in FIG. 11. It is seen that the HOM loss for the compensated fiber is relatively constant over the entire amplifier length while the uncompensated fiber shows a variation greater than two orders of magnitude.

Figure 17:
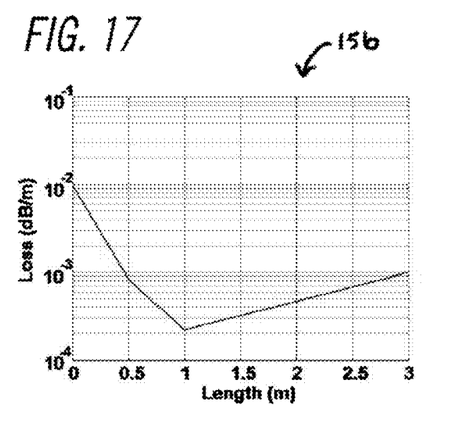
FIG. 17 shows a graph illustrating fundamental mode loss in a compensated fiber.

FIG. 17 shows a graph 156 illustrating the fundamental mode loss in the compensated fiber. It is clear that no significant additional loss for the signal is introduced (in contrast to loss introduced by constant tight coiling as indicated in FIG. 9). The loss throughout the entire length of the amplifier is smaller than 0.01 dB/m. The suggested layout is expected to achieve similar efficiencies and output powers predicted by the cold-fiber estimate.

Figure 18:
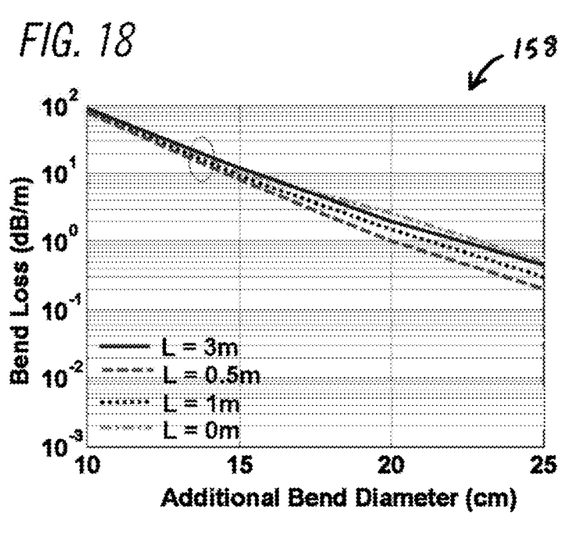
FIG. 18 shows a graph of HOM bend-loss for a compensated fiber at different axial positions for various additional applied bend diameters.

FIG. 18 shows a graph 158 of the HOM bend-loss for a compensated fiber at different axial positions for various additional applied bend diameters, as incorporated from Equation (6). Furthermore, the bend-loss plots for different positions are similar in the entire region of additional bend diameters of interest. The compensation bend was obtained using an effective radial parameter which is an approximation. Owing to this there is potential for variability in necessary compensation bends for different required bend profiles. However from FIG. 12 it is clear that the two are relatively independent and a single compensation bend profile will work for a wide range of additional bends.

It is noted that, the above-described aspects of the invention, compensation is optimized only for a range of applied pump powers. However, the maximum degradation of performance occurs near the higher pump powers. Often, that is also the regime of interest in running the above-described fiber lasers and amplifiers. Thus, according to a further aspect of the invention, the range limitation is overcome by making small modifications to the turn-on sequence of the laser/amplifier. Furthermore, a length-varying curvature does not introduce additional loss for the fundamental mode, compared with the cold fiber estimate.

In the discussion above, the compensatory index gradient was introduced by the physical bending of the fiber. According to a further aspect of the invention, asymmetric temperature distributions in the fiber are utilized to compensate the index gradient using the same thermo-optic effect discussed above. Such an asymmetric gradient can be generated, for example, by asymmetric heat-sinking of the fiber, in lieu of the symmetric heat-sinking that was assumed in the calculations above.

CONCLUSION

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. A method for compensating for a thermal index gradient in an optical fiber, comprising:
   (a) providing an optical fiber for use in an optical system, wherein the fiber has a refractive index profile with ambient temperature loss characteristics including a low loss for a first type of light and a high loss for a second type of light;
   (b) identifying a hot region of the fiber in the optical system, in which a thermal index gradient is induced in the fiber, wherein the thermal index gradient, in the absence of a compensating index gradient, would result in degradation of the fiber's ambient temperature loss characteristics; and
   (c) arranging the fiber according to a layout having a position-varying bending diameter,
      wherein, throughout the identified hot region, the fiber has a compensating bending diameter that induces a compensating index gradient in the fiber, and
      wherein, outside of the identified hot region, the fiber has an operating bending diameter that maintains the fiber's ambient temperature loss characteristics.

2. The method of claim 1,
   wherein the first type of light comprises light propagating in the fundamental $LP_{01}$ mode, and
   wherein the second type of light comprises light propagating in higher-order modes.

3. The method of claim 1,
   wherein the first type of light comprises light having a wavelength within a selected wavelength band, and
   wherein the second type of light comprises light having a wavelength outside of the selected wavelength band.

4. The method of claim 1,
   wherein step (c) comprises arranging the fiber according to a layout in which the bending diameter is adjusted to provide first-order compensation for degradation amounts along the length of the fiber.

5. The method of claim 1,
   wherein step (c) comprises arranging the fiber according to a two-dimensional layout.

6. The method of claim 1,
   wherein step (c) comprises arranging the fiber according to a three-dimensional layout.

7. The method of claim 1,
   wherein the optical system comprises an amplifier or laser, and
   wherein the optical fiber is an amplifier fiber that is connected to one or more pump sources.

8. The method of claim 7,
   wherein, in step (c), the compensating bending diameter is truncated at a selected percentage of pump absorption in the fiber.

9. The method of claim 8, wherein the selected percentage is 30%.

10. The method of claim 8, wherein the selected percentage is 60%.

11. The method of claim 8, wherein the selected percentage is 90%.

12. The method of claim 7, wherein the fiber is connected into the amplifier in a forward-pumped configuration.

13. The method of claim 7, wherein the fiber is connected into the amplifier in a backward-pumped configuration.

14. The method of claim 7, wherein the fiber is connected into the amplifier in a bidirectionally-pumped configuration.

15. The method of claim 1, wherein step (c) comprises arranging the fiber according to a layout comprising a Nielsen/SiCi spiral.

16. The method of claim 1, wherein step (c) comprises arranging the fiber according to a layout comprising a harmonic sum of a Nielsen/SiCi spiral and a circle.

17. The method of claim 1, wherein step (c) comprising arranging the fiber according to a layout comprising a harmonic sum of a Nielsen/SiCi spiral and an Archimedian spiral.

18. The method of claim 1, further including:
   (d) providing means for varying the bending profile as required by varying power levels.

19. A method for compensating for thermal index gradients in an optical fiber connected into an optical system, comprising:
   (a) providing an optical fiber for use in the optical system, wherein the optical fiber has a refractive index profile with loss characteristics at ambient temperature including a low loss for a first type of light and a high loss for a second type of light;
   (b) identifying a hot region of the fiber in the optical system, wherein the identified hot region of the fiber induces a thermal index gradient that, in the absence of a compensating index gradient, would result in degradation of the fiber's ambient temperature loss characteristics; and
   (c) using an asymmetric heating of the fiber to emulate an arrangement of the fiber according to a layout with a position-varying bending diameter,
      wherein, throughout the identified hot region, asymmetric heating of the fiber is used to emulate a compensating bending diameter that induces a compensating index gradient in the fiber, and
      wherein, outside of the identified hot region, asymmetric heating of the fiber is used to emulate an operating bending diameter that maintains the fiber's ambient temperature loss characteristics.

20. An optical system, comprising:
   an optical fiber having a refractive index profile with loss characteristics at ambient temperature including a low loss for a first type of light and a high loss for a second type of light,
   wherein the optical fiber includes a hot region in which a thermal index gradient is induced that, in the absence of a compensating index gradient, would result in degradation of the fiber's ambient temperature loss characteristics,
   wherein the fiber is arranged according to a layout with a position-varying bending diameter, wherein, throughout the identified hot region, the fiber has a compensating bending diameter that induces a compensating index gradient in the fiber, and wherein, outside of the identified hot region, the fiber has an operating bending diameter, different from the first bending diameter, that maintains the fiber's ambient temperature loss characteristics.

* * * * *